(12) United States Patent
Babej et al.

(10) Patent No.: US 10,478,888 B2
(45) Date of Patent: Nov. 19, 2019

(54) METHOD OF FASTENING A RIVET ELEMENT AND CORRESPONDING FASTENING SYSTEM THEREFOR

(71) Applicant: PROFIL Verbindungstechnik GmbH & Co. KG, Friedrichsdorf (DE)

(72) Inventors: Jiri Babej, Lich (DE); Richard Humpert, Bad Nauheim (DE); Christian Sowa, Offenbach (DE)

(73) Assignee: PROFIL Verbindungstechnik GmbH & Co. KG (DE)

( * ) Notice: Subject to any disclaimer, the term of this patent is extended or adjusted under 35 U.S.C. 154(b) by 547 days.

(21) Appl. No.: 15/162,828

(22) Filed: May 24, 2016

(65) Prior Publication Data

US 2017/0008069 A1 Jan. 12, 2017

(30) Foreign Application Priority Data

Jun. 11, 2015 (DE) .................. 10 2015 109 244

(51) Int. Cl.
*B21J 15/04* (2006.01)
*B21J 15/36* (2006.01)

(52) U.S. Cl.
CPC .............. *B21J 15/04* (2013.01); *B21J 15/36* (2013.01)

(58) Field of Classification Search
CPC ........... B21J 15/04; B21J 15/36; B23P 19/062
See application file for complete search history.

(56) References Cited

U.S. PATENT DOCUMENTS

| 2,318,191 A | 5/1943 | Bloomfield |
| 2,433,103 A | 12/1947 | Doyle |
| 4,218,911 A | 8/1980 | Johnston |

FOREIGN PATENT DOCUMENTS

| BE | 376557 A | 11/1931 |
| CN | 101583443 A | 11/2009 |
| CN | 101817142 A | 9/2010 |
| CN | 102788069 A | 11/2012 |
| DE | 102010033714 B3 | 10/2011 |
| GB | 542308 A | 1/1942 |
| WO | 0103881 A1 | 1/2001 |

OTHER PUBLICATIONS

European Search Report dated Oct. 17, 2016 for European Patent Application No. 16169101.9-1702, 2 pages.
Extended German search report for related German application No. 102015109244.1, dated Jan. 13, 2016, pp. 2.
Office Action regarding related CN App. No. 201610402055.4; dated Sep. 29, 2018; 12 pgs.

*Primary Examiner* — John C Hong

(57) ABSTRACT

A method of fastening a rivet element to a workpiece, which has a preshaped hole provided for a reception of a rivet section of the rivet element and which is made planar at least in the region around the preshaped hole. Prior to the fastening process, the workpiece is positioned at a well-defined spacing from a contact surface of a die by at least one movably and/or elastically configured spacer of the die for a reshaping of the rivet section, so that a gap is formed between a wall of the hole and a punch of the die, which is provided for the reshaping of the rivet section. The rivet section is introduced into the gap in a course of the fastening process and is reshaped by the punch in order to engage behind the workpiece in the region of the hole.

14 Claims, 5 Drawing Sheets

Figure 2:
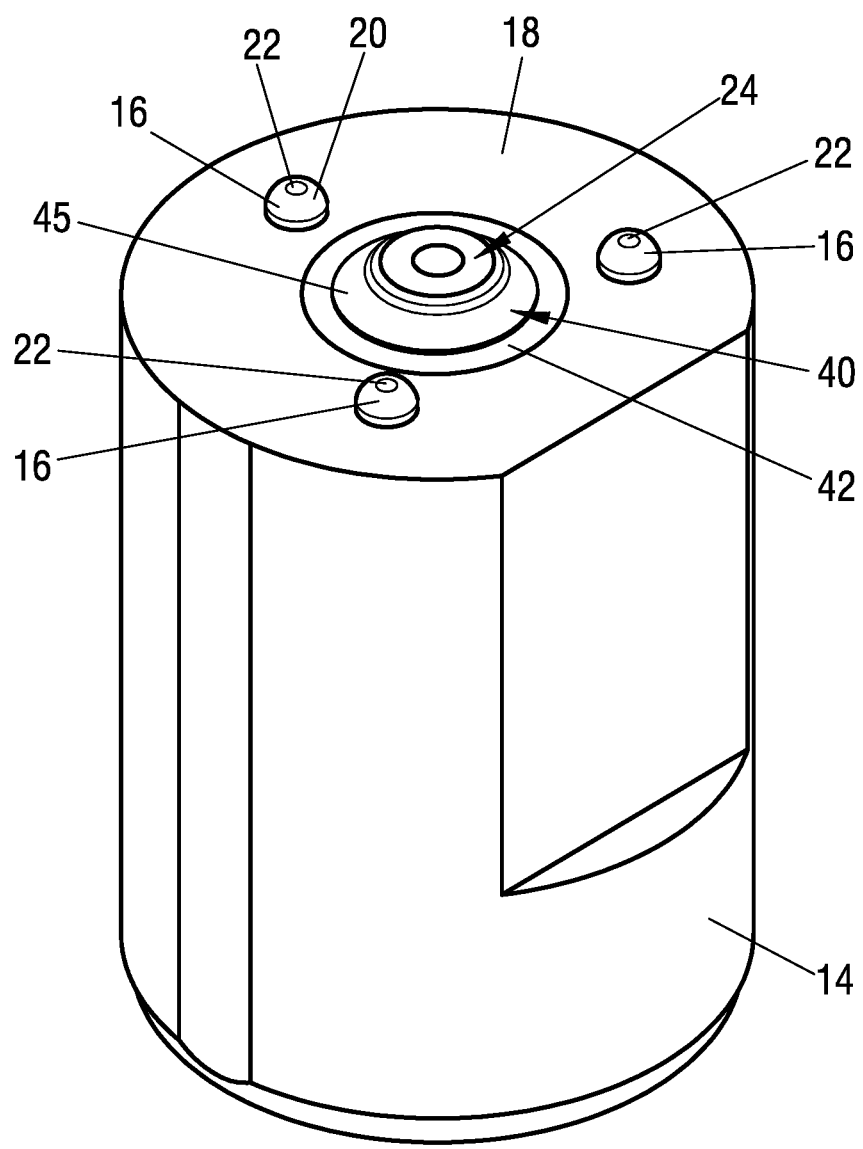

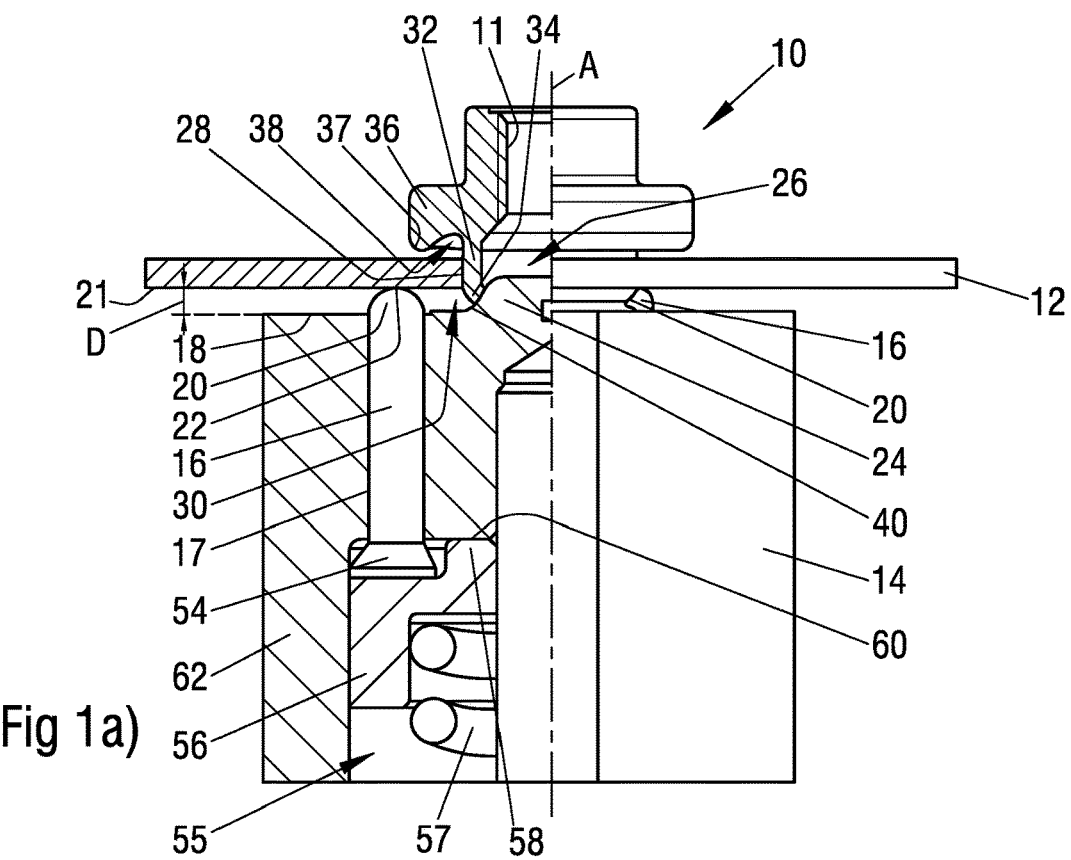
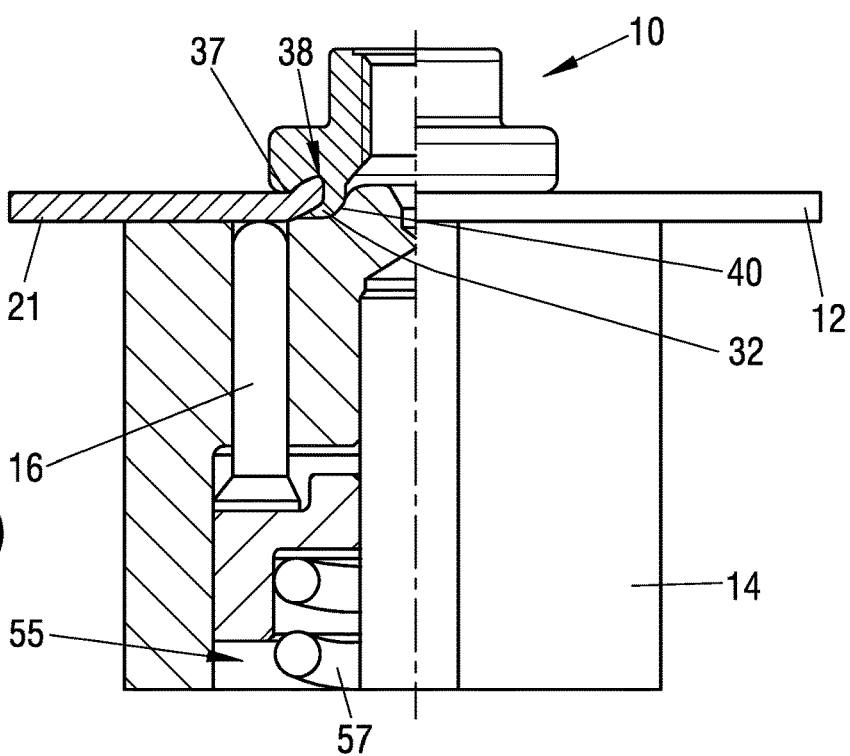

METHOD OF FASTENING A RIVET ELEMENT AND CORRESPONDING FASTENING SYSTEM THEREFOR

The present invention relates to a method of fastening a rivet element to a workpiece which has a preshaped hole provided for the reception of a rivet section of the rivet element.

Such a method is generally known and typically includes the rivet section being introduced into the preshaped hole in the course of the fastening process and being reshaped such that the rivet section engages behind the workpiece and a shape-matched and also force-transmitting rivet connection is established between the rivet element and the workpiece. The rivet section is, for example, a hollow cylindrical section which is bent over and/or beaded over radially outwardly at one end in a known manner in order to establish the rivet connection. In the industrial use of this method, a fastening system comprising a setting head and a die is typically used. In this respect, the workpiece is first positioned at a support surface of the die so that the hole of the workpiece and a central punch of the die are aligned with one another. The rivet element is then moved, by means of the setting head, with its rivet section through the preshaped hole of the workpiece in the direction of the die and is pressed against the punch of the die in order to reshape the rivet section for establishing the rivet connection. The shape of the workpiece is changed into a flare in the region around the hole prior to the fastening of the rivet element so that the rivet section can engage behind the workpiece. A gap into which the rivet section is introduced thereby arises between the punch and the wall of the hole. This means that a sufficiently large space into which the rivet section can engage is provided between the workpiece and the die in this region. However, it is disadvantageous in this respect that the changing of the shape of the workpiece for the formation of the flare or boss which is necessary prior to the fastening may require a separate preprocessing step which has to be carried out in addition to the actual fastening of the rivet element. Furthermore, the corresponding changing of the shape of the workpiece in the region around the hole—which can be disturbing for a variety of reasons—has to be adapted to the dimensions of the rivet section to be reshaped, e.g. to the thickness and length of the rivet section, so that the desired reshaping of the rivet section and the reliable engagement of the rivet bead behind the workpiece are also actually made possible.

It is therefore an object of the present invention to provide a method of the initially named kind in which the above-explained problems are avoided.

This object is satisfied by a method having the features of claim 1.

In accordance with the invention, prior to the fastening process, the workpiece is positioned at a well-defined spacing from a contact surface of a die by means of at least one movably and/or elastically configured spacer of the die for the reshaping of the rivet section, so that a gap is formed between a wall of the hole and a punch of the die, which is provided for the reshaping of the rivet section, and wherein the rivet section is introduced into the gap in the course of the fastening process and is reshaped by the punch in order to engage behind the workpiece in the region of the hole.

A substantial advantage of this solution is that the workpiece is held at a defined spacing from a contact surface of the die by the spacer, whereby a gap which is sufficiently large for the back side engagement of the rivet section when reshaped is precisely fixed and can in particular be reliably maintained or reduced in a controlled manner during the fastening process. In this respect, the method in accordance with the invention is, for example, particularly suitable for differently dimensioned rivet elements and workpieces since the width of the gap required for the reshaping of the rivet section is only fixed by the spacer and can be adapted in a correspondingly simple manner. The width of the gap can—but does not have to —be identical to the spacing. The gap width can also vary, i.e. it can differ locally. It is, for example, possible that the contact surface is—as a rule only slightly—offset with respect to a reshaping surface of the punch of the die. In this case, the width of the gap differs from the spacing.

A further advantage of the method in accordance with the invention can be seen in the fact that the rivet element can be fastened directly to the workpiece and that—apart from the formation of the hole—no preprocessing steps are necessary. The workpiece can remain planar and a changing of the shape into a flare does not have to be provided in the region of the hole. Dispensing with the formation of a flare, at least prior to the attachment of the rivet element, is furthermore also advantageous to the extent that a flared deformation represents a projection which can be disturbing, e.g. on a positioning in the respective processing tool and/or on a removal of the workpiece from the respective processing tool. In this manner, e.g. a punching of the workpiece transversely to the demolding direction of the workpiece is also made possible—in particular with an angled tool—without a movement of the workpiece being impeded by a changing of the shape into a flare.

It is understood that the workpiece does not have to be made completely planar in the region around the hole in order to realize the advantages of the method in accordance with the invention. Slight changes of the shape of the workpiece in the region around the hole, which are for example caused by the formation of the hole, thus in particular do not present a problem for a successful carrying out of the method in accordance with the invention.

Further embodiments of the method in accordance with the invention are set forth in the description, in the claims and in the enclosed drawings.

In accordance with an embodiment, the spacer at least projects out of the contact surface of the die prior to the fastening process, with the section of the spacer which projects out of the contact surface defining the spacing. However, the spacing can generally also be defined with respect to other sections and surfaces of the die. The spacing can, for example, also be defined between the workpiece and a section of the punch of the die. In accordance with the invention, it is only important that the spacing between the workpiece and the die is of such a kind that a gap or an intermediate space is formed between the wall of the hole of the workpiece and the lower side of the workpiece, on the one hand, and the punch of the die or the die itself, on the other hand, in order to be able to reshape the rivet section such that said rivet section engages behind the workpiece in the region of the hole and a shape-matched and preferably force-transmitting connection of the rivet element with the workpiece is thus established.

The method in accordance with the invention can be expanded in that the workpiece is moved toward the contact surface of the die from a specific point in time during the fastening process. A final pressing of the rivet section behind the workpiece can, for example, be effected hereby so that the lower side of the workpiece in the region of the hole is at least substantially made planar and/or smooth despite the fastened rivet section. Furthermore, a force transmission between the rivet element and the workpiece can additionally be brought about by a pressing in of the engaging-behind rivet section. However, the spacing and the width of the gap/intermediate space formed between the workpiece and the punch are also reduced by a movement of the workpiece toward the contact surface. So that the advantage of the invention, of the gap which is sufficiently large for reshaping the rivet section, is nevertheless maintained, it has to be ensured that the workpiece is at least held at the defined spacing from the contact surface of the die until the rivet section has at least partly engaged into the gap and/or engaged behind the workpiece.

In accordance with an embodiment, the workpiece is only moved toward the contact surface after an introduction of at least a part of the rivet section into the gap. It is hereby prevented that the gap is already reduced so much by a movement of the workpiece toward the contact surface that the rivet section is no longer able to engage into the gap. In other words, a reduction of the gap beyond the dimensions of the engaging rivet section is prevented in that the rivet section already engages into the gap prior to the movement of the workpiece.

In accordance with a further embodiment, the workpiece is only moved toward the contact surface after the start of a reshaping of the rivet section. It can hereby be ensured that the workpiece is only moved when the rivet section is already being pressed against the punch of the die with a sufficiently large force and a reshaping of the rivet section has hereby already been set in motion. In this respect, the rivet section does not yet necessarily have to engage into the gap. For example, the gap can be larger prior to the start of the movement of the workpiece than would have actually been necessary for an engagement of the rivet section. A reshaping of the rivet section can thus take place simultaneously with the movement of the workpiece, wherein the rivet section is naturally still introduced into the gap in good time before the available gap/intermediate space has become too small.

In contrast to this, the workpiece can also only be moved toward the contact surface after the completion of the reshaping of the rivet section. In other words, the time of the start of the workpiece movement can be selected such that the reshaping of the rivet section is at least substantially completed and the rivet section already significantly engages around, i.e. engages behind, the workpiece. An unwanted impediment to the reshaping of the rivet section by the workpiece can thus be precluded.

In accordance with a further embodiment, the workpiece is at least moved in that an abutment portion of the rivet element, in particular a flange portion of the rivet element, comes into contact with a side of the workpiece remote from the die and the workpiece is hereby moved in the direction toward the contact surface in the course of a further movement of the rivet element. Alternatively or additionally, a setting head which introduces the rivet element and by which the rivet element is moved in the direction of the die can effect a movement of the workpiece toward the contact surface. However, the workpiece does not necessarily have to be moved actively. For example, a movement of the workpiece toward the contact surface can also be implemented as a relative movement in that the die is moved toward the workpiece.

In accordance with a preferred embodiment, the spacer—at least if it is configured movably—is acted on by an associated preloading device with a defined force and is preloaded into a first position, wherein the spacer defines the spacing in the first position. The preloading device can, for example, be realized by a compression spring, by a hydraulic support system or by a pneumatic support system. If a plurality of spacers are provided, they can be preloaded together by a preloading device. Alternatively, each spacer can be preloaded individually or a respective group of spacers can be preloaded by a respective associated preloading device.

The spacer is preferably formed from a solid material such as steel, titanium or the like. Alternatively, the spacer can also be formed at least in part from an elastic material so that it adopts a first position due to its elastic properties. A preloading device can be dispensed with in this case. Furthermore, constructions are also conceivable in which the spacer is made movable or displaceable and elastic.

In accordance with a further embodiment, the spacer is translated or reshaped during the fastening process out of the first position—actively or preferably passively—in particular by the same amount as the workpiece is moved, when the workpiece is moved toward the contact surface. It is hereby prevented that the workpiece is damaged or plastically deformed by the spacer during its movement toward the contact surface. If the spacer is preloaded into the first position by a preloading device, the corresponding preload force of the preloading device is preferably adapted such that a movement of the spacer out of the first position is possible without damage to or a deformation of the workpiece, i.e. the spacer moves backwardly with respect to the workpiece and does not cause any deformation of the workpiece. In the case of a spacer of which the space can be changed, the elastic properties of the material are selected accordingly.

It is understood that a changing of the shape of the workpiece, in particular a slight changing of the shape of the workpiece, by the spacer can be permitted and that this does not necessarily have to be considered as damage to or a deformation of the workpiece in the above sense. In a number of industrial applications, a slight changing of the shape of the workpiece is irrelevant and does not represent any deficiency of the method, but may even be desired under certain circumstances. A complete avoidance of a changing of the shape of the workpiece by the at least one spacer is thus only a preferred adaptation of the method e.g. if the workpiece is exposed in its later use and/or should satisfy aesthetic demands and/or if such changes of the shape are disadvantageous for other reasons.

In accordance with a further embodiment, during the fastening process, the spacer is moved out of the first position into a second position and/or the shape of the spacer is changed. The workpiece in particular contacts the contact surface of the die in the second position. For this purpose, the spacer can be substantially fully displaced into an inner region of the die in the second position or—in the case of a spacer whose shape can be changed—the shape of the spacer can be changed. The displacement of the spacer into the second position can take place passively or actively. The spacer can, for example, be urged into the second position against the preload direction due to a sufficient application of force which is exerted by the workpiece. Alternatively or additionally, the spacer can also be displaced into the second position by an active movement which is triggered by means of a sensor system. For example, on a predefined force threshold value being exceeded, it can be desired that the spacer is actively retracted in order to avoid damage to the workpiece, to the spacer or to the die. An abrupt active or passive moving backward of the spacer can also be provided when the threshold value is exceeded. In this case, the spacer is then no longer acted on by a substantial force.

In accordance with a further embodiment, during the fastening process, the rivet element is received in a reception chamber of a setting head which is formed in a complementary manner to the fastening element, in particular with the setting head having a workpiece contact surface. The rivet element can hereby be moved toward the die in a controlled manner, wherein the rivet section is introduced into the hole of the workpiece and is then reshaped in the course of a further movement of the rivet element toward the die. The workpiece contact surface of the setting head can in particular contact the workpiece and effect or at least support the movement of the workpiece from the point in time from which the workpiece is moved toward the contact surface.

The spacer is in particular arranged radially spaced apart from the punch so that the rivet section can preferably completely engage behind the workpiece and is not, for instance, impeded by the spacer. A plurality of spacers, in particular three spacers, which are, for example, made in the manner of pins, are arranged symmetrically around the punch of the die. An end section of a respective spacer facing the workpiece preferably has a convex or rounded support surface for a damage-free support of the workpiece. For a reliable reshaping of the rivet section, the reshaping surface can be offset continuously or by one or more stages with respect to the contact surface of the die. A reliable lowering of the rivet section into the workpiece can hereby also be brought about when the workpiece is moved toward the contact surface of the die, i.e. comes into contact with the contact surface.

In accordance with a further preferred embodiment, the workpiece is pressed, at least in the region of the rivet section engaging behind it at least partly into a receiving recess which is formed at an abutment potion of the rivet element. The receiving recess can, for example, be a circularly extending groove which extends between the abutment portion and the rivet section. The abutment portion is in particular formed as a flange portion of the rivet element. The above-explained movement of the workpiece toward the contact surface can in particular be effected in that the flange portion of the rivet element abuts the workpiece and the workpiece is hereby—i.e. also without support by the setting head e.g. if the setting head does not have a workpiece contact surface—inevitably moved along on a further movement of the rivet element in the direction toward the die.

The receiving recess of the rivet element can have a plurality of functions. A margin of the hole can thus, for example, be pressed into the receiving recess and can be received at least in part in the receiving recess. The rivet element can hereby be fixed better to the workpiece. Furthermore, the receiving recess also allows a changing of the shape of the wall of the workpiece which bounds the hole in a direction away from the rivet section which engages behind the workpiece. A reception space for the rivet section is hereby provided at a side of the workpiece which is remote from the receiving recess of the rivet element, i.e. at the lower side of the workpiece, so that the rivet section can be recessed into a plane of the workpiece in the region of the rear engagement in order to obtain a planar lower side of the workpiece. In other words, the rivet section can be pressed against the workpiece in the region of the hole wall, said workpiece in turn deflecting into the receiving recess so that the rivet section does not project from the workpiece after the fastening of the rivet element.

The receiving recess can have one or more ribs which extend transversely to the extent of the receiving recess in the radial direction. A security against rotation can hereby be realized in that the rib or ribs is/are pressed into the workpiece when the workpiece is pressed into the receiving recess. An unwanted rotation of the rivet element relative to the workpiece can thus be counteracted.

The invention furthermore relates to a die for fastening a rivet element to a workpiece, preferably to a sheet metal part, in particular in accordance with one of the above-described embodiments of the method in accordance with the invention, wherein the die at least has a spacer which can be moved and/or of which the shape can be changed, a contact surface for the workpiece as well as a punch for the reshaping of a rivet section of the rivet element.

In accordance with a preferred embodiment, the position of the spacer is adjustable. The adjustability of the position is preferably possible both in the plane of the contact surface and with respect to the length of a section of the spacer projecting out of the contact surface, for example. The well-defined spacing between the workpiece and the die can hereby in particular be set as required. On the other hand, the position of the spacer can be adapted in accordance with the requirements of the workpiece to be supported. The spacer can moreover be releasably connected to the die in order to be able to replace the spacer, for example, due to deterioration caused by wear. Different spacers, e.g. having different lengths, can equally be used in conjunction with a single die.

In accordance with a further embodiment, the spacer can be pushed out of the contact surface by a preloading device with a defined force. The die in particular has at least two spacers which can be acted on together by the preloading device with the defined force.

In accordance with a preferred embodiment, a plurality of spacers, in particular three spacers, are arranged symmetrically around the punch of the die. The spacers can, for example, be arranged on a circular path around the punch. In accordance with an embodiment, three spacers made in the manner of pins are arranged symmetrically around the punch. A particularly advantageous three-point support of the workpiece can hereby be realized. Furthermore, the respective end sections of the spacers which face the workpiece can be shaped convexly in order to ensure a support of the workpiece which is mechanically favorable and which prevents damage when the workpiece is moved in the direction of the contact surface.

Furthermore, the spacer is preferably arranged radially spaced apart from the punch. It is hereby ensured that the rivet section can completely engage into the gap and is not, for instance, impeded by the spacer. The radial spacing from the punch can in particular be selected such that the rivet section can completely engage behind the workpiece in the region of the hole.

In accordance with a further embodiment, the die has a reshaping surface by which the rivet section of the rivet element can be reshaped radially outwardly at least section-wise. The rivet section can in particular be reshaped by the reshaping surface in the direction of the gap. For this purpose, the reshaping surface of the punch is preferably conically and/or concavely shaped at least section-wise. The reshaping surface can transition continuously or offset by one or more stages into the contact surface of the die. Furthermore, a recess can be provided between the contact surface and the punch. A rivet section, in particular a thick-walled rivet section, can hereby, for example, be reshaped such that it can no longer be pressed completely into the workpiece when the workpiece is moved toward the contact surface.

The invention furthermore relates to a fastening system for fastening a rivet element to a workpiece, preferably to a sheet metal part, in particular in accordance with one of the above-described embodiments of the method in accordance with the invention, wherein the workpiece has a preshaped hole provided for the reception of a rivet section of the rivet element and is made planar at least in the region around the preshaped hole. The fastening system includes a die, in particular in accordance with one of the above-described embodiments of the die in accordance with the invention, which has at least one spacer which is movable and/or of which the space can be changed in order to position the workpiece at a well-defined spacing from a contact surface of the die during the fastening process so that a gap is formed between a wall of the hole and a punch of the die for the reshaping of the rivet section. The fastening system furthermore includes a setting head for the introduction of the rivet element into the workpiece, wherein the rivet element is receivable at least in part in the setting head.

In accordance with a preferred embodiment, the setting head has a workpiece contact surface which lies in a plane with a workpiece contact surface of the rivet element when the rivet element is received in the setting head. The workpiece contact surface of the rivet element can, for example, form a common workpiece contact surface together with the workpiece contact surface of the setting head, with the workpiece contacting said common workpiece contact surface during at least one part of the fastening process. In particular when the workpiece is moved in the direction of the contact surface toward the die, such a common enlarged workpiece contact surface has the advantage that the force exerted onto the workpiece is distributed onto a larger surface and a local overloading of the workpiece as well as hereby impending damages or deformations at the workpiece are avoided. The workpiece contact surface preferably extends further outwardly in the radial direction than the spacers. Regions of the workpiece which come into contact with the spacers are then supported by the workpiece contact surface in the axial direction and unwanted deformations of the workpiece, e.g. an arching of the workpiece caused by the spacer, can be prevented.

It is understood that features mentioned within the framework of the description of the method in accordance with the invention can equally be applied to the die described here as well as to the fastening system described here and vice versa. All the embodiments of the die and of the fastening system described here are thus in particular configured to be operated in accordance with one or more of the embodiments of the method described here. Furthermore, all of the embodiments of the die and of the fastening system described here as well as all of the embodiments of the method described here can respectively be combined with one another.

Figure 3:
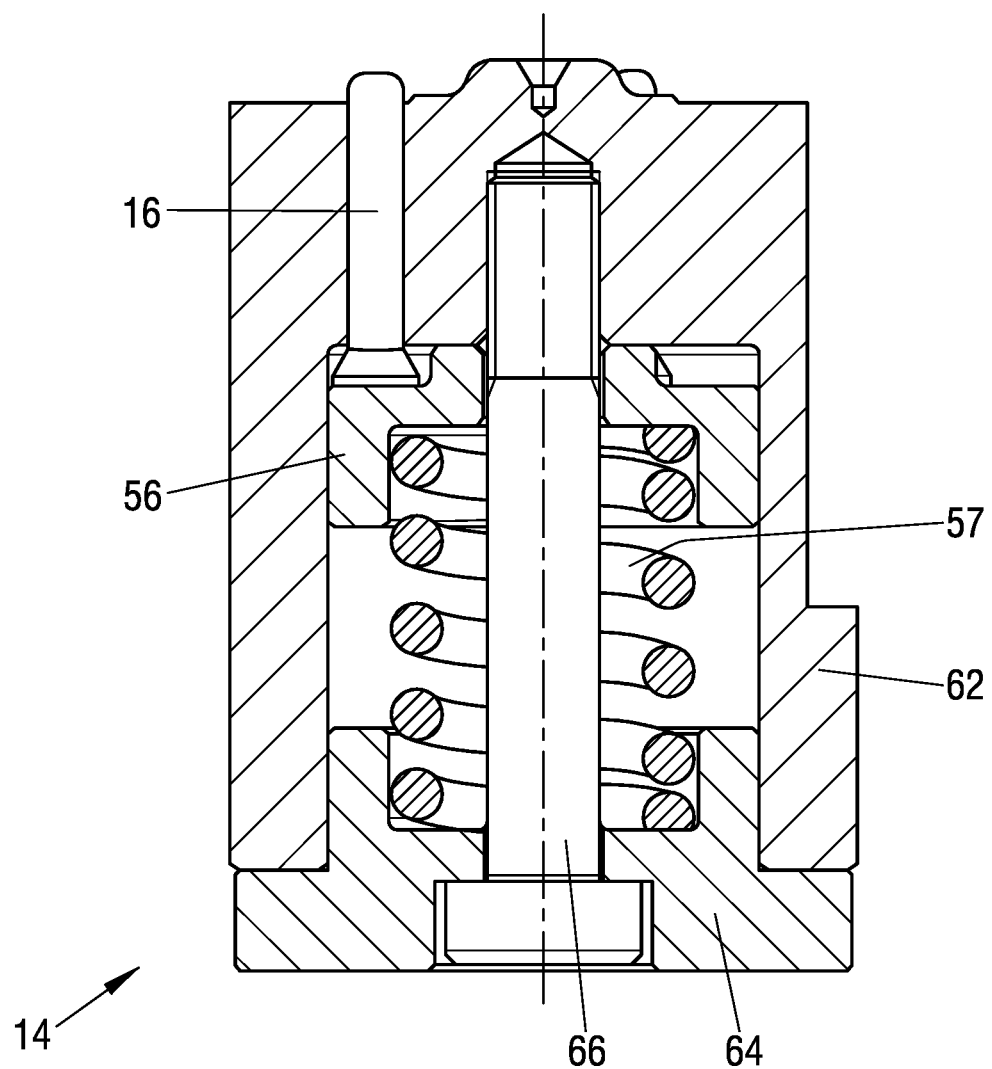
Figure 4:
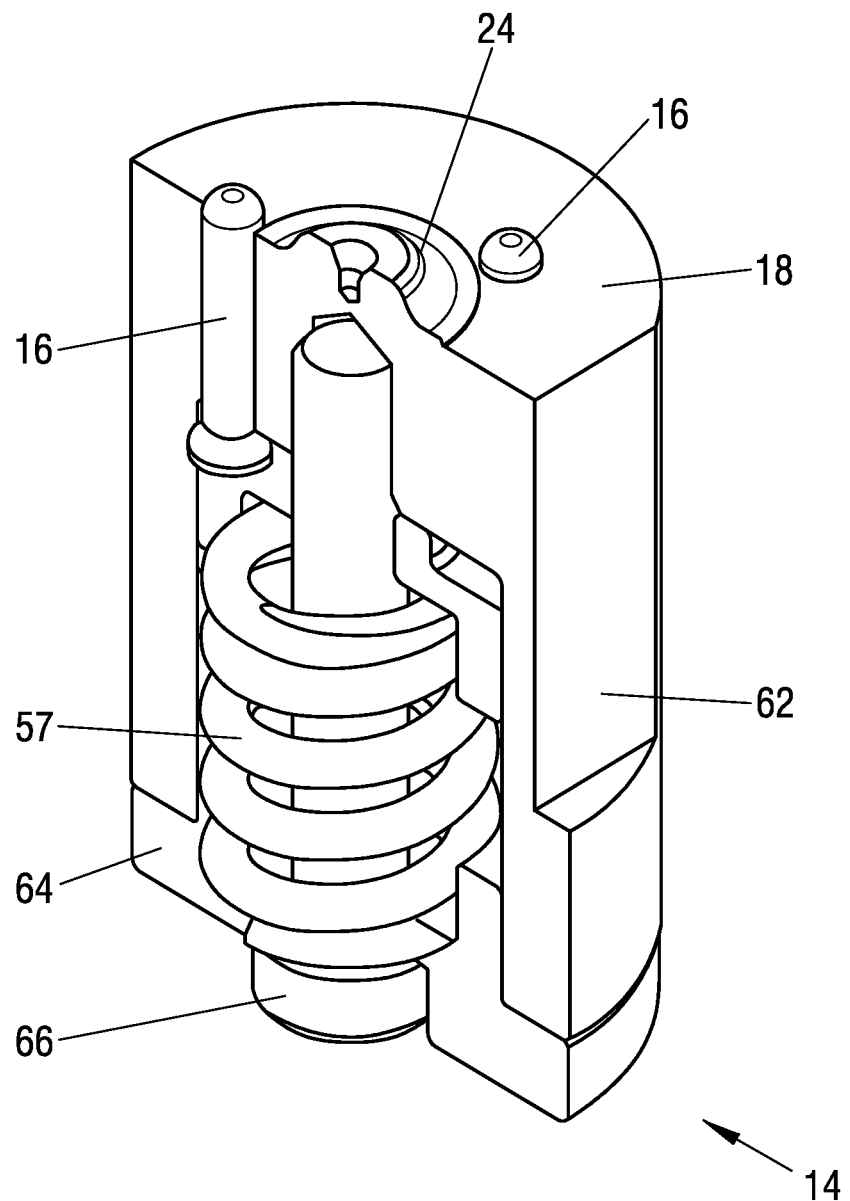

The present invention will be described in the following purely by way of example with reference to an advantageous embodiment of the invention and to the enclosed drawings. There are shown:

FIGS. 1a and 1b an embodiment of the method in accordance with the invention of fastening a rivet element to a sheet metal part;

FIG. 2 a perspective view of a die for carrying out the method in accordance with FIG. 1;

FIG. 3 a cross-sectional view of the die of FIG. 2;

FIG. 4 a perspective cross-sectional view of the die of FIG. 2; and

Figure 5:
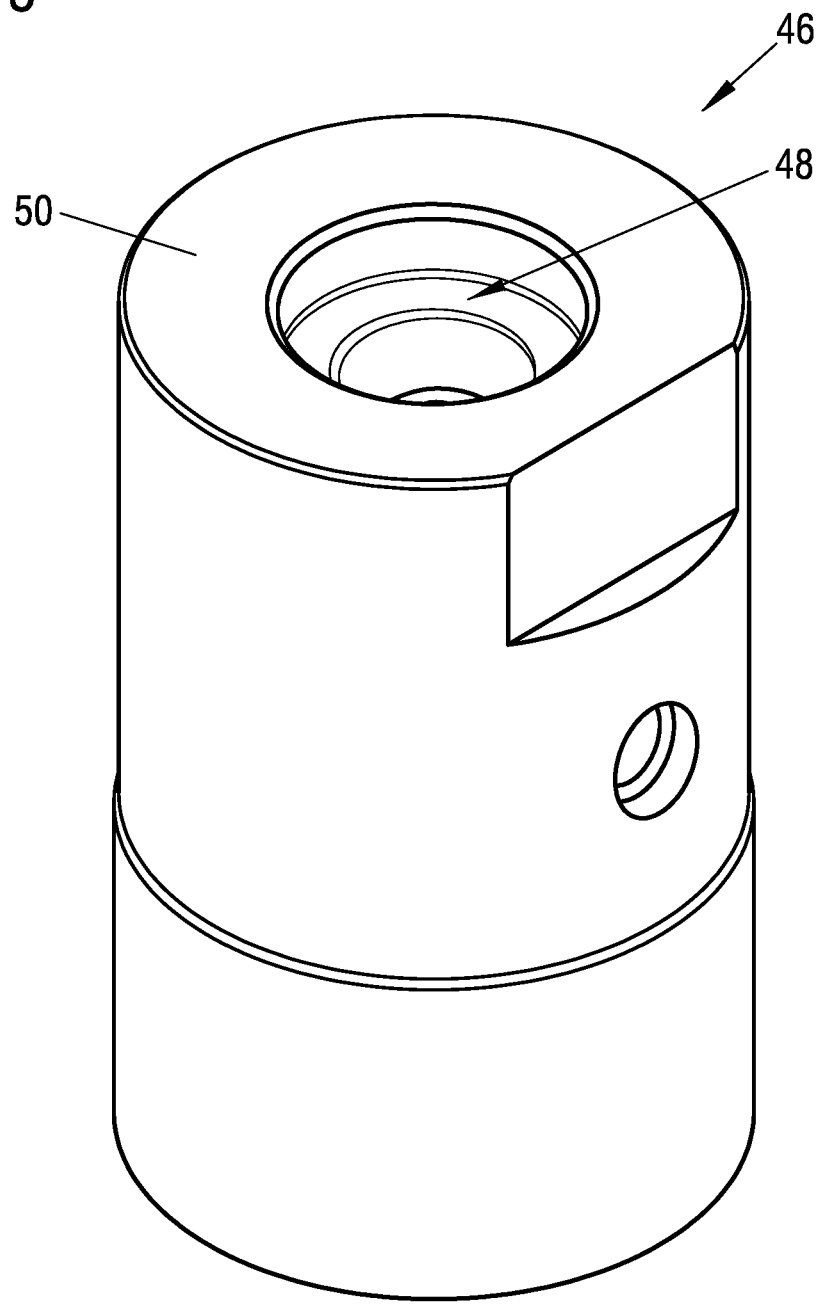

FIG. 5 a perspective view of a setting head for carrying out the method in accordance with FIG. 1.

FIGS. 1a and 1b show two different states during a fastening of a rotationally symmetrically configured rivet element 10 with an internal thread 11 at a sheet metal part 12. It is understood that rivet elements of a different design can also be used instead of the rivet element 10 and that they do not necessarily have to be configured rotationally symmetrically. Rivet elements having a pin section—with or without a thread—are also conceivable.

In the course of the fastening process, the rivet element 19 is fastened to the sheet metal part 12, starting from a position above the sheet metal part 12. In this respect, a die 14 is located at the oppositely disposed side of the sheet metal part 12. In FIG. 1a the sheet metal part 12 is supported on spacers 16 which are movably supported at the die 14, as will be explained in more detail in the following.

The arrangement of FIG. 1a and FIG. 1b is divided in two into a cross-sectional view at the left hand side and a side view at the right hand side. The boundary between the two views extends through an axis of symmetry A which relates to both the rotationally symmetrically configured rivet element 10, the sheet metal part 12—at least in a region around the fastening point—and the die 14.

The spacers 16 extend in parallel with the axis A, wherein the spacers are received in corresponding bores 17 of a die body 62 of the die 14. The spacers 16 are each made in the manner of pins and have an end section 20 which projects out of a contact surface 18 of the die 14. The length of the end sections 20 is set uniformly such that the sheet metal part 12 is horizontally supported on the spacers 16, i.e. perpendicular to the axis A. A spacing D is thereby set between a lower side 21 of the sheet metal part 12—i.e. between the side of the sheet metal part 12 facing the contact surface 18—and the contact surface 18. Each end section 20 includes a substantially convex support surface 22 which faces the sheet metal part 12.

The spacers 16 have a respective conical end section 54 which is supported at a pressure ring 56 which is arranged concentrically to the axis A and in a chamber 55. The pressure ring 56 is preloaded in the axial direction by a compression spring 57 which is concentrically arranged and which extends in the axial direction so that the spacers 16 which are in contact with the pressure ring 56 are uniformly preloaded in the direction of the sheet metal part 12. In FIG. 1a the spacers 16 are in a first position in which the length of the respective end section 20 defines the spacing D between the lower side 21 of the sheet metal part 12 and the contact surface 18 of the die 14. The spacers 16 are maximally extended in the first position. This state is defined by an abutment. Such an abutment is provided in the embodiment described here in that an abutment portion 58 of the pressure ring 56 abuts a top wall 60 of the chamber 55 and a further movement of the pressure ring 56 in the direction toward the sheet metal part 12 is suppressed. The spacing D can be set by the selection of suitably dimensioned spacers 16. In addition, the abutment can be adjustably configured in order to be able to set the spacing D as required.

The die 14 has a punch 24 which projects in part into a circular hole 26 provided at the sheet metal part 12. The axis A extends through the corresponding centers of the punch 24 and of the hole 26. In this respect, the axis A is thus an axis of symmetry for the sheet metal part 12—at least in the region around the hole 26—and for the die 14. The hole 26 was produced prior to the fastening process described here.

The sheet metal part 12 is made planar in the region around the hole 26—apart from slight changes of the shape, for instance, caused by the formation of the hole 26—and does not have a flare in this region. Optionally, however, the sheet metal part 12 can also be made completely planar—as in the embodiment described here. However, this does not necessarily have to be the case.

A gap 30 is formed between a wall 28 of the hole 26 of the sheet metal part 12 and the lower side 21 of the sheet metal part 12, on the one hand, and the punch 24, on the other hand.

The method starts in a starting situation (not shown) in which the rivet element 10 is moved from a position above the sheet metal part 12 in the axial direction in the direction toward the die 14, wherein a rivet section 32 of the rivet element 10 is aligned with the hole 26 of the sheet metal part 12 (coaxial alignment). The rivet section 32 extends away from a flange portion 36 of the rivet element 10 in the axial direction and has an end edge 34 which is rounded at the outside and conical at the inside. A functional section which supports the thread 11 at least in part is provided at the other side of the flange portion 36. The rivet element 10 is a nut element.

A circularly extending groove 38 is provided in a transition region between the flange portion 36 and the rivet section 32. The outer diameter of the rivet section 32 is slightly smaller than the diameter of the hole 26 so that the rivet section 32 can be introduced into the hole 26.

In the state shown in FIG. 1a, the rivet element 10 was already moved so far in the direction toward the die that the rivet section 32 projects into the hole 26. On a further movement of the rivet element 10 in the direction toward the die 14, the inwardly disposed part of the end edge 34 of the rivet section 32 acts together with a concavely configured reshaping surface 40 of the punch 24 and the rivet section 32 is reshaped radially outwardly so that the rivet section 32 engages into the gap 30 and engages behind the sheet metal part 12.

The rivet element 10 is displaced further in the direction toward the die 14 during the reshaping of the rivet section 32, wherein the flange portion 36 comes into contact with a contact surface 37 at the sheet metal part 12. The length of the rivet section 32, i.e. the spacing D, is adapted such that the flange portion 36 only comes into contact with the sheet metal part 12 when the rivet section 32 at least partly engages behind the sheet metal part 12 in the course of the reshaping, in particular when the reshaping which causes the rivet section to engage behind the workpiece is completed.

The rivet element 10 is now moved further in the direction toward the die 14, wherein the sheet metal part 12 is moved along in the direction toward the contact surface 18 of the die 14. The preload force of the compression spring 57 is adapted such that the spacers 16 are urged backwardly against the preload force by the movement of the sheet metal part 12, i.e. the spacers 16 are pushed further into the chamber 55 in the axial direction so that the respective length of the end sections 20 projecting out of the contact surface 18 is reduced.

In FIG. 1b the sheet metal part 12 is shown with the rivet element 10 directly after the completion of the fastening process, wherein the sheet metal part 12 still contacts the contact surface 18 of the die 14. It can be seen that the shape of the sheet metal part 12 is changed in the region of the rivet section 32 which engages behind it during its movement from the position shown in FIG. 1a in the direction toward the die 14. In this respect, the region of the sheet metal part 12 which is originally adjacent to the hole 26 deflects due to a cooperation with the rivet section 32 which engages behind the sheet metal part 12 and is pressed into the groove 38 of the rivet element 10. At the same time, the engaging-behind rivet section 32 is completely displaced into the plane of the sheet metal part 12 which extends perpendicular to the axis A by a cooperation with the reshaping surface 40 of the punch 24 so that the lower side 21 of the sheet metal part 12 which faces the die 14 is substantially made planar. This means that the reshaped rivet section 32 does not project out of the plane of the lower side 21. In addition, the rivet section 32 is deformed in part such that the rivet section 32 nestles against the sheet metal part 12 as a result. A particularly good shape matching and force transmission between the rivet element 10 and the sheet metal part 12 are hereby achieved.

FIG. 2 shows a perspective view of the die 14 of FIG. 1. The die 14 has three spacers 16 which are arranged symmetrically around the punch 24, whose respective end sections 20, in accordance with the position shown in FIG. 1a, project out of the contact surface 18 of the die 14. The spacers 16 are each arranged radially spaced apart from the punch 24.

The reshaping surface 40 includes an outer run-out section 42 which transitions into a curved or arched inner reshaping section 45. This reshaping section can—additionally or alternatively—have concave sections. The contact surface 18 is offset with respect to the run-out section 42 of the punch 24 in the axial direction (FIG. 1a, FIG. 1b and FIG. 2). It is hereby reliably achieved that the engaging-behind rivet section 32 is completely displaced into the plane of the sheet metal part 12 after the fastening of the rivet element 10 so that the lower side 21 of the sheet metal part 12 forms a planar contact surface.

FIG. 3 shows a cross-sectional view of the die 14 which is already shown in part in FIG. 1. It can in particular be seen from FIG. 3 that the end of the compression spring 57 remote from the pressure ring 56 is supported on a die base 64 of the die 14 which partly engages into the die body 62. The die base 64 is fastened to the die body 62 by means of a screw 66. The axial position of the die base 64 can be set relative to the die body 62 by the screw 66. The degree of compression of the compression spring 57 can be regulated by the axial position of the die base 64 in order to be able to set the preload force of the compression spring 57 as required. If the die base 64 is, for example, displaced axially downwardly from the position shown in FIG. 3 by a corresponding screwing movement of the screw 66, the preload force is reduced in accordance with a spring characteristic of the compression spring 57. In FIG. 4 the die of FIG. 3 is shown in a sectioned perspective view obliquely from above.

FIG. 5 shows a perspective view of a setting head 46 by which the rivet element 10, starting from the starting situation (not shown), can be moved into the positions shown in FIG. 1a and FIG. 1b in the direction toward the die 14 and can be fastened to the sheet metal part 12. The setting head 46 has a reception chamber 48 which is formed in a complementary manner to the rivet element 10 so that the rivet element 10 can be received in the reception chamber 48, i.e. can be inserted in the reception chamber 48. The reception chamber 48 is dimensioned such that only the rivet section 32 projects out of a contact surface 50 of the setting head 46 with an inserted rivet element 10. The flange portion 36, i.e. its contact surface 37, thus forms a common contact surface for the sheet metal part 12 together with the contact surface 50 of the setting head 46. The diameter of the contact surface 50 approximately corresponds to the diameter of the contact surface 18 of the die 14 (which, however, is not a compulsory embodiment). The contact surface 50 of the setting head 46 ensures that regions of the sheet metal part 12 which are in contact with the spacers 16 can support themselves in the axial direction during the fastening process. Unwanted deformations of the sheet metal part 12 by the spacers 16 are thus avoided.

REFERENCE NUMERAL LIST 10 rivet element
11 internal thread
12 sheet metal part
14 die
16 spacer
17 bore
18 contact surface
20 end section
21 lower side of the sheet metal part
22 support surface
24 punch
26 hole
28 wall
30 gap
32 rivet section
34 end edge
36 flange portion
37 contact surface
38 groove
40 reshaping surface
42 run-out section
44 reshaping section
46 setting head
48 reception chamber
50 contact surface
54 end section
56 pressure ring
57 compression spring
58 abutment portion
60 top wall
62 die body
64 die base
66 screw
A axis of symmetry
D spacing

The invention claimed is:

1. A method of fastening a rivet element (10) to a workpiece (12) which has a preshaped hole (26) provided for a reception of a rivet section (32) of the rivet element (10) and which is made planar at least in a region around the preshaped hole (26),
wherein, prior to the fastening process, the workpiece (12) is positioned at a well-defined spacing (D) from a contact surface (18) of a die (14) by means of at least one movably and/or elastically configured spacer (16) of the die (14) for a reshaping of the rivet section (32), so that a gap (30) is formed between a wall (28) of the hole (26) and a punch (24) of the die (14), which is provided for the reshaping of the rivet section (32), the workpiece (12) only being moved toward the contact surface (18) after the start of the reshaping of the rivet section (32), and wherein the rivet section (32) is introduced into the gap (30) in a course of the fastening process and is reshaped by the punch (24) in order to engage behind the workpiece (12) in the region of the hole (26), wherein the spacer (16) is moved from a first position into a second position during the fastening process, the spacer (16) being substantially fully displaced into an inner region of the die (14) in the second position.

2. A method in accordance with claim 1, wherein the spacer (16) has a section (20) which projects out of the contact surface (18) of the die (14) prior to the fastening process, with the section (20) of the spacer (16) which projects out of the contact surface (18) defining the spacing (D).

3. A method in accordance with claim 1, wherein the workpiece is held at a defined spacing from the contact surface of the die by the spacer, and (12) is only moved toward the contact surface (18) after a completion of the reshaping of the rivet section (32).

4. A method in accordance with claim 1, wherein the workpiece (12) is moved toward the contact surface (18) by an abutment portion of the rivet element (10), in particular by a flange portion (36) of the rivet element (10) and/or by a setting head (46) which introduces the rivet element (10).

5. A method in accordance with claim 1, wherein the spacer (16) is preloaded into the first position by an associated preloading device (57) with a defined force.

6. A method in accordance with claim 5, wherein the spacer (16) is moved from the first position during the fastening process when the workpiece (12) is moved toward the contact surface (18).

7. A method in accordance with claim 1, wherein the spacer (16) adopts a first position due to elastic properties of the spacer (16), with the spacer (16) defining the spacing (D) in the first position.

8. A method in accordance with claim 7, wherein the shape of the spacer (16) is changed when the workpiece (12) is moved toward the contact surface (18).

9. A method in accordance with claim 7, wherein the shape of the spacer (16) is changed during the fastening process, in particular with the spacer (16) being substantially fully displaced into an inner region of the die (14) in the second position.

10. A method in accordance with claim 1, wherein the workpiece (12) is pressed, at least in the region of the rivet section (32) engaging behind the workpiece (12), into a receiving recess of the rivet element.

11. A method in accordance with claim 10, wherein the receiving recess into which the workpiece (12) is pressed is a groove (38), which is formed at a flange portion (36) of the rivet element.

12. A method in accordance with claim 1, wherein the workpiece is a sheet metal part.

13. A fastening system for fastening a rivet element (10) to a workpiece (12), in particular in accordance with a method in accordance with claim 1, wherein the workpiece (12) has a preshaped hole (26) provided for the reception of a rivet section (32) of the rivet element (10) and is made planar at least in the region around the preshaped hole (26),
wherein the fastening system includes a die (14) in order to position the workpiece (12) at a well-defined spacing (D) from a contact surface (18) of the die (14) during the fastening process so that a gap (30) is formed between a wall (28) of the hole (26) and the punch (24) of the die (14),
wherein the fastening system furthermore includes a setting head (46) in which the rivet element (10) is receivable at least in part.

14. A fastening system in accordance with claim 13, wherein the setting head (46) has a workpiece contact surface (50) which lies in a plane with a workpiece contact surface (37) of the rivet element (10) when the rivet element (10) is received in the setting head (46).

* * * * *